United States Patent Office 3,808,201
Patented Apr. 30, 1974

3,808,201
PROCESS FOR THE MANUFACTURE OF 6-ACYL-AMINO - 2,2 - DIMETHYL-3-HYDROXY PENAM COMPOUNDS
Karl Heusler, Basel, Switzerland, and Robert Burns Woodward, Cambridge, Mass., assignors to Ciba-Geigy Corporation, Ardsley, N.Y.
No Drawing. Filed May 26, 1971, Ser. No. 147,180
Claims priority, application Switzerland, June 5, 1970, 8,467/70
Int. Cl. C07d 99/16
U.S. Cl. 260—239.1                                    11 Claims

ABSTRACT OF THE DISCLOSURE

The invention concerns the manufacture of 6-acyl-amino-2,2-dimethyl-3-hydroxy-penam compounds by reductive cleavage of the esterified carboxyl grouping in a 6-acylamino-2,2-dimethyl - 3 - arylcarbonylmethoxycarbonyl-amino-penam compound in the presence of water.

---

The Pat. No. 3,705,160 (application No. 842,028) filed July 15, 1969 by Karl Heusler et al.) proposes a process for the manufacture of thiazacyclic hydroxy compounds, especially of 6 - N-Ac-amino-3-hydroxy-2,2-dimethyl-penam compounds of the formula

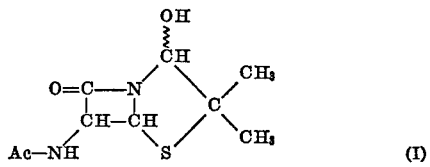

in which Ac represents the acyl residue of an organic acid, and of O-esters of such compounds, wherein in a penam compound of the formula

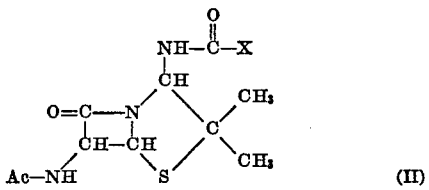

in which X together with the carbonyl grouping represents an esterified carboxy or thiocarboxy group capable of being split under neutral or weakly acidic conditions, the group of the formula —C(=O)—X is split under neutral or weakly acidic conditions in the presence of water, and, if desired, in a resulting compound the free hydroxyl group in 2-position is acylated, and/or, if desired, in a resulting compound, which contains an acylamino grouping containing protected functional groups, such groups are liberated, and/or, if desired, a resulting isomer mixture is resolved into the individual isomers.

A preferred group X is the residue of the formula —O—$R_o^a$, where $R_o^a$ stands for a 2-halogeno-lower alkyl residue, and such a residue may contain one, two or more halogen atoms, that is to say chlorine, bromine or iodine atoms, the 2-chloro- and 2-bromo-lower alkyl residue containing advantageously several, preferably three, chlorine or bromine atoms, whereas a 2-iodo-lower alkyl residue may contain a single iodine atom. The residue $R_o^a$ preferably represents a 2-polychloro-lower alkyl, such as 2-polychloroethyl residue, in the first place the 2,2,2-trichloroethyl residue, or the 2,2,2-trichloro-1-methylethyl residue, but may also be, for example, a 2-polybromo-lower alkyl, such as the 2,2,2-tribromoethyl residue, or a 2-iodo-lower alkyl, for example, the 2-iodoethyl residue.

According to the process of the Pat. No. 3,705,160 the preferred group of the formula —NH—C(=O)—O—$R_o^a$ is eliminated by treatment with a chemical reducing agent in the presence of water.

The present invention is based on the observation that compounds of the formula I are also obtained, when a penam compound of the Formula II, in which X stands for the residue of the formula —O—$R_o^b$, wherein $R_o^b$ represents an arylcarbonylmethyl group, in which aryl is an optionally substituted aromatic hydrocarbon residue, is treated with a chemical reducing agent in the presence of water, and, if desired, in a resulting compound the free hydroxyl group in 2-position is acylated, and/or, if desired, in a resulting compound, which contains an acyl-amino grouping comprising protected functional groups, such groups are liberated and/or, if desired, a resulting isomer mixture is resolved into the individual isomers.

In an arylcarbonylmethyl group $R_o^b$, aryl stands for a bicyclic or polycyclic, but especially a monocyclic, optionally substituted aromatic hydrocarbon residue, for example, an optionally substituted naphthyl group or in the first place an optionally substituted phenyl group. Such group may be substituted, for example, by optionally substituted hydrocarbon residues, such as lower alkyl, for instance methyl, ethyl or isopropyl, as well as trifluoromethyl, phenyl or phenyl-lower alkyl, for example, benzyl or phenylethyl, or functional groups, such as free or functionally modified carboxyl groups, for example, carboxyl, lower alkoxycarbonyl, such as methoxycarbonyl or ethoxycarbonyl, also carbamoyl groups or cyano, optionally functionally modified, such as esterified, hydroxyl groups, for example, halogeno, such as fluoro, chloro or bromo, or etherified hydroxyl or mercapto groups, such as lower alkoxy, for example, methoxy, ethoxy, propoxy, isopropyloxy, butyloxy or tertiary butyloxy, nitro groups and/or optionally substituted amino groups, such as di-lower alkylamino, for example, dimethylamino or diethylamino, or lower alkanoylamino, for example, acetylamino.

The methyl portion of an arylcarbonylmethyl residue $R_o^b$ is preferably unsubstituted, but it may also contain an organic residue, for example, an optionally substituted aliphatic hydrocarbon residue, such as lower alkyl, for example, methyl, ethyl, propyl, isopropyl, butyl or tertiary butyl, or an optionally substituted cycloaliphatic, aromatic or araliphatic hydrocarbon residue, such as optionally substituted cycloalkyl, for example, cyclohexyl, or a further aryl or araliphatic group, for example, optionally substituted phenyl, as well as optionally substituted phenyl-lower alkyl, for example, benzyl.

The arylcarbonylmethyl group $R_o^b$ is preferably the unsubstituted phenacyl group, though it may also be a phenacyl group whose aromatic portion is substituted, for example, by lower alkyl, such as methyl, lower alkoxy, such as methoxy, or halogeno, for example, fluoro, chloro or bromo.

The treatment with a chemical reducing agent is carried out in the presence of at least one mole of water, under mild conditions, if necessary while heating, but generally at room temperature or even with cooling.

Chemical reducing agents are especially appropriate reducing metals, as well as reducing metal compounds, for example, metal alloys or amalgams, especialy those which in the presence of a hydrogen donor form nascent hydrogen, furthermore strongly reducing metal salts.

Especially suitable are zinc, zinc alloys, for example, zinc-copper, or zinc amalgam, also magnesium, using zinc, for example, advantageously in the presence of an acid, such as an organic carboxylic acid, for example, a lower alkanecarboxylic acid, in the first place acetic acid, with the addition of water, or of an aqueous alcohol, such as a lower alkanol, for example methanol, ethanol or iso-propanol, which may be used in combination with an organic carboxylic acid, e.g. acetic acid, and alkali metal amalgams, such as sodium amalgam or potassium amalgam, furthermore aluminium amalgam in the presence of a moist (i.e. aqueous) solvent, such as diethyl ether or a lower alkanol.

Strongly reducing metal salts are in the first place chromium-II-compounds, for example, chromium-II-chloride or chromium-II-acetate, which are preferably used in the presence of an aqueous medium containing water-miscible organic solvents, such as lower alkanols, lower alkanecarboxylic acids or ethers, for example, methanol, ethanol, acetic acid, tetrahydrofuran, dioxane, ethyleneglycol dimethyl ether or diethyleneglycol dimethyl ether, or a carboxylic acid amide, for example, dimethylformamide.

It has been found that the present process may be carried out under extremely mild conditions and especially without the formation of undesired by-products, as may be formed, for instance, when a compound of the Formula II is used, in which X represents a 2,2,2-trichloroethyloxy group, for example, through reductive dehalogenation.

If desired, the 2-hydroxyl group in a compound accessible by the present process may be acylated in the known manner, using for this purpose any one of the usual acylating agents, such as an acid or a reactive derivative thereof, the former, for instance, in the presence of an appropriate condensing agent, such as a carbodiimide, for example, dicyclohexyl carbodiimide, and the latter, if necessary, in the presence of a basic reagent, such as an organic tertiary base, for example, triethylamine or pyridine. Reactive derivatives of acids are their anhydrides, including the inner anhydrides such as ketenes, or isothiocyanates, or mixed anhydrides (for example, those formed with halogenoformic acid esters, for example chloroformic acid ethyl ester, or halogeno-lower alkanoic acid halides, e.g. trichloroacetyl chloride), also acid halides, especially chlorides, or reactive esters, such as esters of acids with alcohols or phenols containing electron-attracting groupings, as well as with N-hydroxy compounds, for example, cyanomethanol, p-nitrophenol or N-hydroxysuccinimide. The acylating reaction may be performed in the presence or absence of solvents or solvent mixtures, if necessary, with cooling or heating, under increased pressure and/or in an inert gas, for example, under nitrogen.

In an acyl group AC of a compound obtained according to the present process protected functional groups may be liberated in the usual manner, for example, by hydrolysis, reduction or by treatment with an acid.

A mixture of isomers obtained by the above process may be separated in the known manner, for example, by fractional crystallization, adsorption chromatography (column or thin-layer chromatography) or other appropriate separating methods into the component isomers. A resulting racemate containing salt-forming groups, into which in view of the intended splitting of the racemate suitable substituents may have been introduced temporarily in the usual manner, can be separated into the antipodes according to conventional methods, for example, by formation of mixture of diastereoisomeric salts with optically active salt-forming agents, separation of the mixture into the diastereoisomeric salts and conversion of the isolated salts into the free compounds, or by fractional crystallization from optically active solvents.

The present invention includes also any modification of the process, in which a resulting intermediate is used as starting material and any remaining steps are carried out with it, or the process is interrupted at any stage thereof; it is also possible to use starting materials in form of derivatives, for example, salts, thereof or to form them in situ.

The invention includes also any new intermediate as well as processes for the manufacture thereof.

Preferred starting materials and reaction conditions are those, which lead to the compounds mentioned below as being specially preferred; they may be in the form of isomer mixtures or of pure isomers.

Preferred starting materials and products of the Formulae II and I, respectively are those, in which a group Ac is in the first place the acyl residue of an organic carboxylic acid, especially the acyl residue of an optionally substituted aliphatic, cycloaliphatic, cycloaliphatic-aliphatic, aromatic, araliphatic, heterocyclic or heterocyclyl-aliphatic carboxylic acid or is the acyl residue of a carbonic acid semi-derivative.

The aliphatic residue of an aliphatic carboxylic acid, which term includes also formic acid, is an optionally substituted aliphatic hydrocarbon residue, such as alkyl, alkenyl or alkinyl, especially lower alkyl or lower alkenyl or lower alkinyl, which may contain, for example, up to 7, preferaby up to 4 carbon atoms. Such residues may, if desired, be substituted by one, two or several functional groups, for example, free, etherified or esterified hydroxyl or mercapto groups, such as lower alkoxy, lower alkenyloxy, lower alkylenedioxy, optionally substituted phenyloxy or phenyl-lower alkoxy, lower alkylmercapto or optionally substituted phenylmercapto or phenyl-lower alkylmercapto, lower alkoxycarbonyloxy or lower alkanoyloxy, as well as by halogeno or nitro, or by optionally substituted amino groups, acyl, such as lower alkanoyl, or optionally functionally modified carboxyl, such as carbo-lower alkoxy, optionally N-substituted carbamoyl or cyano.

A cycloaliphatic or cyloaliphatic-aliphatic residue of an appropriate carboxylic acid is an optionally substituted cycloaliphatic or cycloaliphatic-aliphatic hydrocarbon residue, for example, monocyclic, bicyclic or polycylic cycloalkyl or cycloalkenyl, or cycoalkyl- or cycloalkenyl-lower alkyl or -lower alkenyl, in which cycloalkyl contains up to 12, such as 3 to 8, or preferably 3 to 6 ring carbon atoms, whereas cycloalkenyl contains, for example, up to 12, such as 3 to 8, especially 5 to 8, preferably 5 or 6 ring carbon atoms, and contains 1 or 2 double bonds, and the aliphatic portion of a cycloaliphatic-aliphatic residue may contain, for example, up to 7, preferably up to 4 carbon atoms. The above-mentioned cycloaliphatic or cycloaliphatic-aliphatic residues may, if desired, be mono-, di- or polysubstituted, for example, by optionally substituted aliphatic hydrocarbon residues, such as those mentioned above, for example, optionally substituted lower alkyl, or, for example, as the above-mentioned aliphatic hydrocarbon residues, by functional groups.

The aromatic residue of a corresponding carboxylic acid is an optionally substituted aromatic hydrocarbon substituted lower alkyl, or, for example, as the above-residue, for example, a mono-, bi- or polycyclic aromatic hydrocarbon residue, especially a phenyl or a biphenylyl, as well as naphthyl residue, which may be mono-, di- or polysubstituted, for example, like the above-mentioned aliphatic or cycloaliphatic hydrocarbon residues.

The araliphatic residue in an araliphatic carboxylic acid is, for example, an optionally substituted araliphatic hydrocarbon residue, such as an optionally substituted araliphatic hydrocarbon residue, such as an optionally substituted aliphatic hydrocarbon residue containing, for example, up to three, optionally substituted mono-, bi- or polycyclic aromatic hydrocarbon residues, and is in the first place phenyl-lower alkyl or -lower alkenyl or -lower alkinyl; such residues contain, for example, 1 to 3 phenyl groups and may be mono-, di- or polysubstituted in the aromatic and/or aliphatic portion, for example, like the above-mentioned aliphatic and cycloaliphatic residues.

Heterocyclic residues in heterocyclic or heterocyclyl-aliphatic carboxylic acids are especially mono-, bi- or polycyclic aza-, thia-, oxa-, thiaza-, thiadiaza-, oxaza-, diaza-, triaza- or tetrazacyclic residues of aromatic character, which may be mono-, di- or polysubstituted, for example, like the afore-mentioned cycloaliphatic residues. The aliphatic portion of a heterocyclyl-aliphatic residue may have, for example, the meaning indicated above for the corresponding cycloaliphatic-aliphatic or araliphatic residue.

The acyl radical of a carbonic acid semi-derivative is preferably the acyl radical of a corresponding semi-ester, in which the esterifying organic residue represents an optionally substituted aliphatic, cycloaliphatic, aromatic or araliphatic hydrocarbon residue or a heterocyclyl-aliphatic residue, in the first place the acyl radical of a lower alkyl semi-ester of carbonic acid, which may be substituted, preferably in the α- or β-position (that is to say a lower alkoxy-carbonyl residue, which may be substituted in the lower alkyl portion, preferably in α-or β-position), and a lower alkenyl, cycloalkyl, phenyl or phenyl-lower alkyl semi-ester of carbonic acid, which may be substituted in the lower alkenyl, cycloalkyl, phenyl or pheny-lower alkyl portion (that is to say a lower alkenyloxy-carbonyl, cycloalkoxy-carbonyl, phenyloxycarbonyl or phenyl-lower alkoxy-carbonyl residue which may be substituted in the lower alkenyl, cycloalkyl, phenyl or phenyl-lower alkyl portion). Acyl radicals of a carbonic acid semi-ester may also be corresponding residues of lower alkyl semi-esters of carbonic acid, in which the lower alkyl portion contains a heterocyclic group, for example, one of the above-mentioned heterocyclic groups of aromatic character, in which both the lower alkyl residue and the heterocyclic group may be substituted; such acyl radicals are lower alkoxy-carbonyl groups, in which the lower alkyl portion may be substituted and contains an optionally substituted heterocylic group of aromatic character.

Lower alkyl is, for example, methyl, ethyl, propyl, isopropyl, butyl, isobutyl sec. butyl, tert.-butyl, pentyl, isopentyl, hexyl, isohexyl or n-heptyl, whereas lower alkenyl may be, for example, vinyl, allyl, isopropenyl, 2- or 3-methallyl or 3-butenyl, and lower alkinyl is, for example, propargyl or 2-butinyl.

Cycloalkyl is, for example, cyclopropyl, cyclobutyl, cyclopentyl, cyclohexyl or cycloheptyl or adamantyl; cycloalkenyl is, for example, 2- or 3-cyclopentenyl, 1-, 2- or 3-cyclohexenyl or 3-cycloheptenyl or 2-cyclopropenyl. Cycloalkenyl-lower alkyl or -lower alkenyl is, for example, cyclopropyl-, cyclopentyl-, cyclohexyl- or cycloheptyl-methyl, -1,1- or -1,2-ethyl, -1,1-, -1,2- or -1,3-propyl, -vinyl or -allyl, whereas cycloalkenyl-lower alkyl or -lower alkenyl group is, for example, 1-, 2- or 3-cyclopentenyl-, 1-, 2- or 1,2-ethyl, -1,1-, -1,2- or -1,3-propyl, -vinyl or -allyl.

Naphthyl is 1- or 2-naphthyl, whereas biphenylyl is, for example, 4-biphenylyl.

Phenyl-lower alkyl or phenyl-lower alkenyl is, for example, benzyl, 1- or 2-phenylethyl, 1-, 2- or 3-phenylpropyl, diphenylmethyl, trityl, styryl or cinnamyl.

Heterocyclic residues are, for example, monocyclic monoaza-, monothia- or monooxacyclic residues of aromatic character such as pyridyl, for example 2-, 3- or 4-pyridyl, thienyl, for example, 2-thienyl, or furyl, for example, 2-furyl, or bi-cyclic monoazacyclic residues of aromatic character, such as quinolinyl, for example 2-quinolinyl or 4-quinolinyl, or iso-quinolinyl, for example, 1-isoquinolinyl, or monocyclic thiaza-, thiadiaza-, oxaza-, diaza-, triaza- or tetraazacyclic residues of aromatic character, such as oxazolyl, isoxazolyl, thiazolyl 1,2,4- or 1,3 4-thiadiazolyl, isothiazolyl, pyrimidinyl, 1,2,4-triazolyl or 1- or 5-tetrazolyl. Heterocyclyl-aliphatic residues are heterocyclyl-lower alkyl or -lower alkenyl residues, especially those containing the above-mentioned residues.

Etherified hydroxyl groups are in the first place lower alkoxy, for example methoxy, ethoxy, propyloxy, isopropyloxy, butyloxy, isobutyloxy, sec.-butyloxy, tert.-butyloxy, n-pentyloxy or tert.-pentyloxy, as well as substituted lower alkoxy, such as halogeno-lower alkoxy, especially 2 - halogeno-lower alkoxy, for example, 2,2,2-trichloroethoxy or 2-iodoethoxy, furthermore lower alkenyloxy, for example, vinyloxy or allyloxy, lower alkylenedioxy, for example, methylene- or ethylenedioxy, as well as isopropylidenedioxy, cycloalkoxy, for example, cyclopentyloxy, cyclohexyloxy or adamantyloxy, phenyloxy, phenyl-lower alkoxy, for example, benzyloxy or 1- or 2-phenylethoxy, or lower alkoxy substituted by monocyclic monoaza-, monooxa- or monothia-cyclic groups of aromatic character, such as pyridyl-lower alkoxy, for example, 2-pyridylmethoxy, furyl-lower alkoxy, for example, furfuryloxy, or thienyl-lower alkoxy, for example, 2-thienyloxy.

Etherified mercapto groups are lower alkylmercapto, for example, methylmercapto or ethylmercapto, phenylmercapto, or phenyl-lower alkylmercapto, for example, benzylmercapto.

Esterified hydroxyl groups is in the first place halogeno, for example, fluoro, chloro, bromo or iodo, and also lower alkanoyloxy, for example, acetyloxy or propionyloxy.

Substituted amino groups are mono- or disubstituted amino groups containing as substituents in the first place optionally substituted mono- or divalent aliphatic, cycloaliphatic, cycloaliphatic-aliphatic, aromatic or araliphatic hydrocarbon residues or acyl groups. Such amino groups are especially lower alkylamino or di-lower alkylamino, for example, methylamino, ethylamino, dimethylamino or diethylamino, or lower alkyleneamino, optionally interrupted by hetero atoms, such as oxygen, sulfur or nitrogen atoms (of which the latter may be substituted, for example, by lower alkyl), such as pyrrolidino, piperidino, morpholino, thiomorpholino or 4-methylpiperazino, or acylamino, especially lower alkanoylamino, such as acetylamino or propionylamino.

Lower alkanoyl residue is, for example, acetyl or propionyl.

Lower alkoxy-carbonyl is, for example, methoxycarbonyl, ethoxycarbonyl, n-propyloxy-carbonyl, isopropyloxycarbonyl, tert.-butyloxycarbonyl or tert.-pentyloxycarbonyl.

Optionally N-substituted carbamoyl groups are, for example, N-lower alkyl- or N,N-di-lower alkyl-carbamoyl, such as N-methyl-, N-ethyl-, N,N-dimethyl- or N,N-diethylcarbamoyl.

Lower alkenyloxy-carbonyl is, for example, vinyloxycarbonyl, whereas cycloalkoxycarbonyl and phenyl-lower alkoxycarbonyl, in which cycloalkyl or phenyl-lower alkyl has the above meaning, is, for example, adamantyloxycarbonyl, benzyloxycarbonyl or diphenylmethoxycarbonyl or α-4-biphenylyl-α-methyl-ethoxy-carbonyl. Lower alkoxy-carbonyl, in which the lower alkyl residue contains, for example, a monocyclic monoaza-, monooxa- or monothiacyclic group, is, for example, furyl-lower alkoxycarbonyl, such as furfuryloxy-carbonyl, or thienyl-lower alkoxycarbonyl, for example, 2-thienyloxy-carbonyl.

O-esters of compounds of the Formula I are those with organic sulphonic acids, especially with aliphatic or aromatic sulphonic acids, in which aliphatic and aromatic residues have the above meaning, such as lower alkanesulphonic, for example, methanesulphonic or ethanesulphonic acids, or arylsulphonic, for example, benzenesulphonic or toluenesulphonic acids, and especially with organic carboxylic acids, such as aliphatic, cycloaliphatic, cycloaliphatic-aliphatic, aromatic, araliphatic, heterocyclic or heterocyclyl-aliphatic carboxylic acids which contain the afore-mentioned organic residues, such as lower alkanecarboxylic acids which may be substituted, for example, by halogeno, being, for example formic, propionic, pivalic, diethylacetic or chloroacetic acid, cycloalkanecarboxylic acids, such as cyclopentane- or cyclohexanecarboxylic acid, cycloalkyl-lower alkanecarboxylic acids, such as cyclohexylacetic acid, aromatic and araliphatic carboxylic acids, in which the aromatic ring may be substituted, for example, by lower alkyl or lower alkoxy, halogeno, nitro, carboxyl, lower alkoxy-carbonyl, carbamoyl or cyano, being, for example benzoic, naphthoic, phenylacetic, phenylpropionic or cinnamic acid, or carboxylic acids containing optionally substituted heterocyclic residues, for example, pyridine-, furan- or thiophenecarboxylic acids, such as 2-pyridyl- or 2-thienyl-acetic acid, as well as 3-(2-furyl)-propionic acid.

Especially valuable are penam compounds of the formula

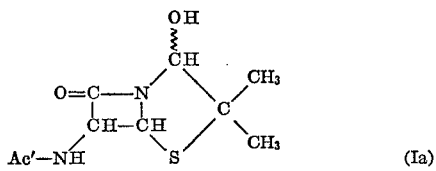
(Ia)

resulting from the present process, in which Ac' stands for an acyl radical occurring in a pharmacologically active or biosynthetically accessible N-acyl derivative of 6-amino-penicillanic acid or of 7-amino-cephalosporanic acid, for example, the residue of the formula

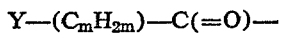

in which $m$ is 0, 1, 2, 3 or 4, preferably 1, and one carbon atom of the preferably linear alkylene residue of the formula —$(C_mH_{2m})$— may be substituted by an unsubstituted or substituted amino group, a free, etherified or esterified hydroxyl or mercapto group or a free or functionally modified carboxyl group, for example, by one of the aforementioned groups of this type, and wherein Y stands for an aromatic or cycloaliphatic hydrocarbon residue which may be substituted in the nucleus, for example, by the substituents indicated for the above alkylene radical, or by sulpho or nitro groups, or for a heterocyclic residue, the latter being preferably of aromatic character, or for a hydroxyl or mercapto group etherified by an optionally substituted aromatic or cycloaliphatic hydrocarbon residue or a heterocyclic residue, the latter preferably being of aromatic character, and represents, for example, 2,6 - dimethoxybenzoyl, tetrahydronaphthylcarbonyl, 2-methoxynaphthylcarbonyl, 2-ethoxynaphthylcarbonyl, phenylacetyl, phenyloxyacetyl, phenylthioacetyl, bromophenylthioacetyl, 2-phenyloxypropionyl, α-phenyloxyphenylacetyl, α-methoxy-phenylacetyl, α-methoxy-3,4-dichlorophenylacetyl, α - cyanophenylacetyl, phenylglycyl (containing an optionally protected amino group), benzyloxycarbonyl, benzylthioacetyl, benzylthiopropionyl, hexahydrobenzyloxycarbonyl, cyclopentylcarbonyl, α-aminocyclopentylcarbonyl or α-amino-cyclohexylcarbonyl (containing an optionally protected amino group), 2-thienylacetyl, α-cyano-2-thienylacetyl, α-amino-2-thienylacetyl (containing an optionally protected amino group), 3-thienylacetyl, 2-furylacetyl, 2-phenyl - 5 - methyl - isoxazolyl-carbonyl or 2-(2-chlorophenyl) - 5 - methyl-isoxazolylcarbonyl group, or represents a residue of the formula $C_nH_{2n+1}C$—(=O)—, or $C_nH_{2n-1}C$—(=O)—, in which $n$ is 0 or an integer up to 7, and the chain may be linear or branched and optionally interrupted by oxygen or sulfur and/or may be substituted, for example, by halogeno, trifluoromethyl, free or functionally modified carboxyl, such as cyano, or free or substituted amino or nitro groups, and represents, for example, propionyl, butyryl, hexanoyl, octanoyl, butylthioacetyl, acrylyl, crotonyl, 2-pentenoyl, allylthioacetyl, chloroacetyl, 3-chloropropionyl, 3-bromopropionyl, aminoacetyl, 2-carboxypropionyl, cyanoacetyl or 2-cyano-3-dimethylacrylyl, or represents a residue of the formula Z—NH—CO—, in which Z stands for an optionally substituted aromatic or aliphatic hydrocarbon residue, especially a lower alkyl residue optionally substituted by lower alkoxy and/or halogeno. such as 2-chloroethylcarbamoyl. The acyl group Ac' is especially a monocyclic arylacetyl or aryloxyacetyl or a lower alkanoyl or lower alkenoyl residue, which may be interrupted by a sulfur atom or substituted by carboxyl and/or amino. Such residues are, for example, 4-hydroxyphenylacetyl, hexanoyl, octanoyl, 3-hexenoyl, allylmercaptoacetyl, n-butylmercaptoacetyl or 5-amino-5-carboxyvaleryl, and primarily phenylacetyl or phenyloxyacetyl, or may also be an acyl radical, which is easily eliminable, especially under acidic conditions, such as the acyl radical of an easily removable semi-ester of carbonic acid, such as a lower alkoxycarbonyl residue easily eliminable under acidic conditions, for example, on treatment with trifluoroacetic acid, e.g. tert.-butyloxycarbonyl or tert. - pentyloxycarbonyl, cycloalkoxycarbonyl, for example, adamantyloxycarbonyl, phenyl-lower alkoxy-carbonyl, for example, diphenylmethoxycarbonyl, as well as α-4-biphenylyl-α-methyl - ethoxy - carbonyl, or furyl-lower alkoxycarbonyl, for example, furfuryloxycarbonyl.

The compounds accessible by the present process are useful as starting materials for the manufacture of other compounds which may be used as pharmacologically active or as intermediate products; their further use has been described and illustrated by examples in the Pat. No. 3,705,160 (application No. 842,028 filed July 15, 1969 by Karl Heusler et al.) and in German Auslegeschrift No. 1,935,637.

The starting materials of the Formula II used in the present process may be manufactured, for example, by converting an acid compound of the formula

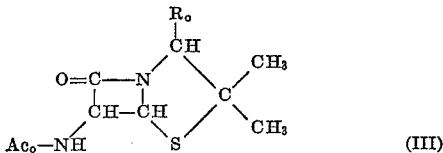
(III)

in which $Ac_0$ represents the acyl radical of an organic carboxylic acid, in which free functional groups, such as hydroxyl, mercapto and especially amino and carboxyl groups are preferably protected, and $R_0$ stands for a carboxyl group —$C(=O)$—OH (Compound IIIa) or a salt thereof into the corresponding acid azide compound of the Formula III, in which $R_0$ stands for the azidocarbonyl residue —$C(=O)$—$N_3$ (Compound IIIb), the resulting compound is converted (with the elimination of nitrogen) into the corresponding isocyanate compound of the Formula III, in which $R_0$ represents the isocyanato group —N=C=O (Compound IIIc), and is simultaneously or subsequently treated with a compound of the formula HO—$R_0^b$ (IV) and, if desired, a resulting compound is converted into another compound of the Formula II, and/or if desired, a resulting isomer mixture is resolved into the component isomers.

The conversion of an acid Compound IIIa or a suitable salt, especially an ammonium salt, thereof into the corresponding acid azide IIIb may be performed, for example, by conversion into a mixed anhydride (for example, by treatment with a haloformic acid lower alkyl ester, such as ethyl chloroformate, in the presence of a basic medium, such as triethylamine) and treatment of such an anhydride with an alkali metal azide, such as sodium azide, or an ammonium azide, for example, benzyltrimethylammonium azide. The resulting acid azide Compound IIIb can be converted into the desired isocyanate Compound IIIc in the presence or absence of an alcohol compound of the Formula IV under the reaction conditions, for example, by heating; as a rule, the isocyanate Compound IIIc need not be isolated and can be converted directly into the desired starting material in the presence of the compound of the Formula IV.

If desired or required, the reaction with an alcohol of the Formual IV may be carried out in an inert solvent, for example, in an optionally halogenated hydrocarbon, such as carbon tetrachloride, chloroform or methylenechloride, or in an aromatic solvent, such as benzene, toluene or chlorobenzene, preferably at an elevated temperature.

In a resulting starting material process an acyl radical $Ac_0$ may be eliminated in known manner, for example, by treatment with an appropriate halogenating agent, such as phosphorus pentachloride, reaction of the imide chloride with an alcohol, such as a lower alkanol, and decomposition of the imino ether, preferably under acidic conditions. The acyl residue of a suitable semiester of carbonic acid, such as a lower alkoxycarbonyl residue capable of being eliminated under acidic conditions, for example, the tert.-butyloxycarbonyl, tert.-pentyloxycarbonyl, admantyloxycarbonyl or diphenylmethoxycarbonyl residue, can be eliminated, for example, by treatment with trifluoroacetic acid. Protected functional groups in an acyl residue Ac₀ of a resulting compound may be liberated in the usual manner, for example, by hydrolysis or reduction or by treatment with an acid.

A free amino group in a starting material accessible in the manner described above may be acylated by known methods, such as, for example, the free hydroxyl group in a compound of the Formula I, that is to say by treatment with a free or reactive, functionally modified carboxylic acid, for example, with an acid chloride or anhydried, optionally in the presence of a condensing agent.

The invention includes also the new starting materials of the Formula II, in which X represents the residue of the formula —O—R₀ᵇ, wherein R₀ᵇ has the meaning defined above, especially penam compounds of the formula

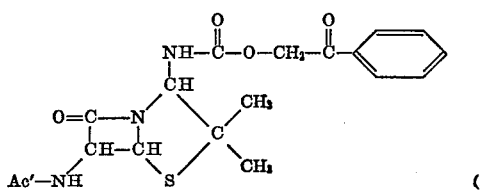

(IIa)

in which Ac' has the meaning indicated above and stands especially for a monocyclic arylacetyl or aryloxyacetyl or a lower alkanoyl or lower alkenoyl residue, such as the 4-hydroxyphenylacetyl, hexanoyl, heptanoyl or 2-hexenoyl and in the first place for phenylacetyl or phenyloxyacetyl, or for an acyl residue of a carbonic acid semiester, which is easily eliminated under acidic conditions, such as a corresponding lower alkoxycarbonyl, cycloalkoxycarbonyl, phenyl-lower alkoxycarbonyl or furyl-lower alkoxycarbonyl residue, being eliminated, for example, by treatment with trifluoroacetic acid.

The following examples illustrate the invention.

EXAMPLE 1

A solution of 4.84 g. of 2,2-dimethyl-3-phenacyloxycarbonylamino-6-phenyloxyacetylamino-penam in 50 ml. of tetrahydrofuran is mixed with 75 ml. of aqueous acetic acid of 90% strength. The mixture is cooled to 0° C., and while stirring vigorously it is mixed portionwise within 15 minutes with 12 g. of zinc dust, then allowed to warm up to room temperature and stirred for an additional 60 minutes. The unreacted iznc dust is filtered off on a Buechner funnel containing a layer of a diatomaceous earth preparation. The filter residue is twice suspended in methylenechloride, once more filtered and rinsed with methylenechloride. The combined filtrates are evaporated to dryness under reduced pressure at as low a temperature as possible and the residue is taken up in 300 ml. of methylenechloride and 150 ml. of a 0.5-molar aqueous dipotassium hydrogenphosphate solution. The isolated aqueous phase is extracted twice with 100 ml. portions of methylenechloride and the combined organic solutions are washed with 100 ml. of the above-mentioned phosphate buffer and twice with 100 ml. each time of a concentrated aqueous sodium chloride solution, then dried over anhydrous magnesium sulphate and evaporated under reduced pressure.

The residue is placed to a chromatography column with silica gel (containing about 5% of water) as adsorbent. The column is washed with methylenechloride to remove acetophenone; 9:1- and 4:1-mixtures of methylenechloride and ethyl acetate elute the 3-hydroxy-2,2-dimethyl-6-phenyloxyacetylamino-penam of the formula

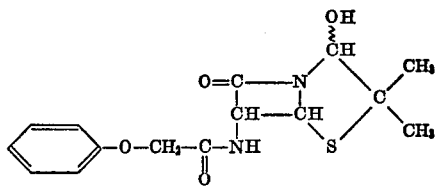

as a colorless foam which is dissolved in absolute diethyl ether and treated dropwise with water-saturated diethyl ether. The product is obtained in form of colorless crystalline needles which are dried over phosphorus pentoxide under a high vacuum at room temperature. The resulting product is obtained in the form of the semihydrate which melts unsharply between 62 and 85° C.; the pure product melts at 62–70° C.; thin-layer chromatogram (on silica gel): $R_f=0.35$ (system: benzene and ethyl acetate 1:1); infrared absorption spectrum (in methylenechloride: characteristic bands at 2.93μ, 3.09μ, 5.65μ, 5.96μ, 6.29μ, 6.65μ, 6.75μ, 8.57μ, 9.27μ, 10.00μ and 11.95μ.

The starting material may be prepared as follows:

While stirring and cooling at —10° C., a solution of 2.625 g. of penicillin-V in 30 ml. of tetrahydrofurane is mixed with 5.31 ml. of a 10 ml.-solution of 2 ml. of triethylamine in tetrahydrofurane. Then, 3.6 ml. of a 10 ml.-solution of 2 ml. of ethyl chloroformate in tetrahydrofurane are slowly added at —10° C. and on completion of the addition the mixture is stirred for 90 minutes at —10° to —5° C.

The reaction mixture is treated with a solution of 0.51 g. of sodium azide in 5.1 ml. of water, stirred for 30 minutes at 0° to —5° C., diluted with 150 ml. of ice water and extracted three times with methylenechloride; the organic extracts are washed with water, dried and evaporated at 25° C. under reduced pressure, to furnish the amorphous penicillin-V azide as a faintly yellowish oil; infrared absorption spectrum (in methylenechloride): characteristic bands at 3.04μ, 4.70μ, 5.60μ, 5.82μ (shoulder), 5.93μ, 6.26μ, 6.71μ, 8.50μ and 9.40μ.

A solution of 2.468 g. of the penicillin-V azide in 30 ml. of benzene is heated for 30 minutes at 70° C. The resulting crude 3-isocyanato-2,2-dimethyl-6-phenyloxyacetylamino-penam can be obtained by evaporating the solution under reduced pressure; infrared absorption spectrum (in methylenechloride): characteristic bands at 3.03μ, 4.46μ, 5.59μ, 5.93μ, 6.26μ, 6.62μ, 6.70μ, 7.53μ, 8.28μ, 8.53μ, 9.24μ and 9.40μ.

A solution of 6.6 g. of crude 3-isocyanato-2,2-dimethyl-6-phenyloxyacetylamino-penam in 75 ml. of absolute methylenechloride is mixed with 2.6 g. of phenacyl alcohol. The golden yellow solution is kept for 30 minutes at room temperature (the characteristic isocyanate band at 4.45μ in the infrared spectrum can no longer be detected; 40% solution in methylenechloride) and then evaporated to dryness. The foamy residue is chromatographed on a column of 300 g. of silica gel, the excess phenacyl alcohol (melting at 85–86° C. after recrystallization from a mixture of methylenechloride and cyclohexane) being eluted with methylenechloride. The 2,2-dimethyl - 3 - phenacyloxycarbonylamino-6-phenyloxyacetylamino-penam of the formula

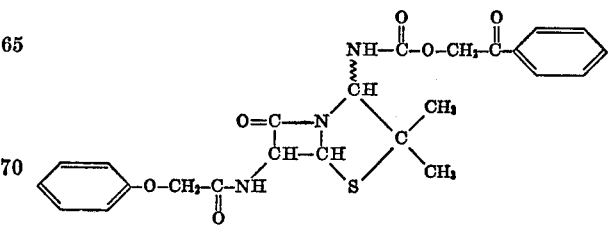

is eluted with 4:1- and 1:1-mixtures of methylenechloride and ethyl acetate and recrystallized from a mixture of methyl acetate and cyclohexanone. The product is obtained in form of colorless, felted needles and melts at 168–169° C. (uncorrected);

$[\alpha]_D^{20} = +77° \pm 1°$ (c.=0.991 in chloroform); thin-layer chromatography (on silica gel): $R_f$=0.58 (system: toluene/acetone 1:1), $R_f$=0.46 (system: toluene/acetone 3:1) and $R_f$=0.51 (system: toluene/ethyl acetate 1:1); ultraviolet absorption spectrum (in chloroform); $\lambda_{max}$=276 m$\mu$ ($\epsilon$=2500), 270 m$\mu$ ($\epsilon$=2700) and 245 m$\mu$ ($\epsilon$=34800); $\lambda_{shoulder}$=292 m$\mu$ ($\epsilon$=1000); and $\lambda_{min}$=273 m$\mu$ ($\epsilon$=2150) and 266 m$\mu$ ($\epsilon$=2500); infrared absorption spectrum: characteristic bands at 2.90$\mu$, 3.39$\mu$, 5.57$\mu$, 5.74$\mu$, 5.86$\mu$, 6.23$\mu$, 6.62$\mu$, 6.67$\mu$ (shoulder), 7.27$\mu$, 8.21$\mu$ (broad), 8.46$\mu$, 9.25$\mu$ and 9.34$\mu$ (shoulder) (in methylenechloride), and at 2.93$\mu$, 2.98$\mu$, 5.67$\mu$, 5.74$\mu$, 5.80$\mu$, 5.91$\mu$, 6.23$\mu$, 6.42$\mu$ and 6.62$\mu$ (in mineral oil).

EXAMPLE 2

A solution of 2.34 g. of 2,2-diethyl-3-phenacyloxycarbonylamino-6-phenylacetylamino-penam in 25 ml. of tetrahydrofurane is mixed with 37 ml. of aqueous acetic acid of 90% strength, cooled to 0° C. and treated portionwise within 10 minutes with 6 g. of zinc dust while stirring vigorously. The mixture is stirred for 20 minutes and the excess zinc dust is then filtered off through a layer of a diatomaceous earth preparation. The filter residue is stirred three times with methylenechloride and filtered. The combined filtrates are cautiously evaporated to dryness under reduced pressure and the residue is taken up in 150 ml. of methylenechloride and 75 ml. of a 0.5-molar aqueous dipotassium hydrogenphosphate solution. The aqueous phase is separated and extracted twice with 50 ml. each of methylenechloride. The organic extracts are washed with 50 ml. of the dipotassium hydrogenphosphate solution and twice with 50 ml. each of a saturated aqueous sodium chloride solution, dried over anhydrous magnesium sulphate and the solvent is evaporated under reduced pressure. The residue is chromatographed on 50 times its own weight of silica gel (to which 7% of water has been added). Acetophenone is eluted with methylenechloride; the 3-hydroxy-2,2-dimethyl-6-phenylacetylamino-penam of the formula

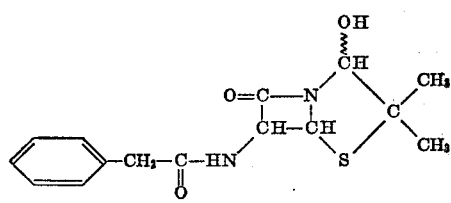

is eluted with methylenechloride containing 15 to 20% of methyl acetate and obtained as a colorless oil; infrared absorption spectrum (in methylenechloride): characteristic bands at 2.90$\mu$, 3.05$\mu$, 5.64$\mu$, 5.99$\mu$, 6.70$\mu$ and 9.28$\mu$.

The starting material may be prepared as follows:

A solution of 17.3 g. of 3-isocyanate-2,2-dimethyl-6-phenylacetylamino-penam in 150 ml. of absolute benzene is mixed with 6.5 g. of phenacyl alcohol. The golden yellow solution is kept for 16 hours at room temperature, after which time no isocyanate band at 4.4$\mu$ can be detected in the infrared spectrum (solution of about 4% strength in methylenechloride). The reaction solution is evaporated to dryness under reduced pressure and the residue is chromatographed on a column of 800 g. of silica gel. A small quantity of unreacted phenacyl alcohol (M.P. 85–86° C.) is washed out with methylenechloride containing 3% of ethyl acetate, whereas the 2,2-dimethyl-3 - phenacyloxycarbonylamino - 6 - phenylacetylamino-penam is eluted with methylenechloride containing 5–10% of ethyl acetate. The chromatographically uniform fractions are combined and crystallized from a mixture of acetone and cyclohexane. The colorless crystalline product melts at 175–178° C. (uncorrected). The analytically pure product, obtained from two recrystallizations from a mixture of methyl acetate and cyclohexane, melts at 182–183° C. (uncorrected); thin-layer chromatogram (on silica gel plates; developed with iodine vapor): $R_f$=0.59 (system: toluene/ethyl acetate 1:1); $R_f$=0.82 (system: toluene/acetone 1:1); and $R_f$=0.42 (system: toluene/acetone 3:1); $[\alpha]_D^{20}$=+87°±1° (c.=0.985 in chloroform); infrared spectrum: characteristic bands at 2.92$\mu$, 5.59$\mu$, 5.76$\mu$, 5.87$\mu$, 5.94$\mu$, 6.31$\mu$, 6.62$\mu$ (shoulder), 6.67$\mu$, 8.22$\mu$, 848$\mu$, 9.22$\mu$, 10.20$\mu$ and 10.44$\mu$ (in methylene chloride) and at 2.96$\mu$, 3.02$\mu$, 5.59$\mu$, 5.86$\mu$, 6.02$\mu$, 6.25$\mu$, 6.45$\mu$, 6.58$\mu$, 7.98$\mu$, 8.15$\mu$, 8.28$\mu$, 9.15$\mu$, 9.24$\mu$, 9.32$\mu$, 1018$\mu$, 11.47$\mu$, 13.94$\mu$ and 14.58$\mu$ (in mineral oil).

In an analogous manner, choosing the appropriate starting materials, it is possible to obtain the 3-hydroxy-2,2-dimethyl - 6 - tert.-butyloxycarbonyl-amino-penam as a colorless oil which, after crystallization from a mixture of diethyl ether and pentane, melts at 106–110° C. (after sintering above 100° C.) $[\alpha]_D^{20}$=+115±1° (c.=0.858 in chloroform), thin-layer chromatogram (silica gel): $R_f$ about 0.53 (system: benzene/ethyl acetate 1:1); infrared absorption spectrum (in methylenechloride): characteristic bands at 2.91$\mu$, 3.04$\mu$, 5.64$\mu$, 5.84$\mu$, 6.68$\mu$, 7.33$\mu$ and 8.60$\mu$; from 2,2-dimethyl-3-phenacyloxy-carbonylamino-6-tert.-butyloxycarbonyl-amino-penam.

EXAMPLE 3

A solution of 0.14 g. of 3-hydroxy-2,2-dimethyl-6-phenyloxyacetylamino-penam in 2 ml. of anhydrous benzene is mixed with 1 ml. of acetic acid anhydride and 0.2 ml. of pyridine and heated for 2 hours at 50° C. The mixture is then evaporated under reduced pressure and the residue is purified by chromatography on 1 g. of silica gel (washed with acid). Elution is carried out with 10 ml. of benzene and 40 ml. of a 19:1-mixture of benzene and ethyl acetate, to furnish the pure 3-acetyloxy-2,2-dimethyl-6-phenyloxyacetylamino-penam, which, after crystallization from a mixture of diethyl ether and pentane and recrystallization from diethyl ether, melts at 129–131° C.; $[\alpha]_D^{20}$=+85°±1° (c.=1.135 in chloroform); infrared absorption spectrum (in methylenechloride); characteristic bands at 3.05$\mu$, 5.61$\mu$, 5.74$\mu$, 5.94$\mu$, 6.28$\mu$, 6.64$\mu$, 6.72$\mu$, 8.32$\mu$ and 9.62$\mu$.

EXAMPLE 4

A solution of 0.132 g. of 3-hydroxy-2,2-dimethyl-6-phenyloxyacetylamino-penam in 2 ml. of benzene is mixed with 0.75 ml. of a 10 ml.-solution of 1 ml. of benzoyl chloride in benzene and with 0.1 ml. of pyridine and the mixture is stirred for 20 hours at room temperature, then diluted with benzene and washed successively with 0.5 N-hydrochloric acid, a dilute aqueous sodium hydrogencarbonate solution and water; the aqueous washings are washed with benzene. The combined benzene solutions are dried and evaporated under reduced pressure. The residue is chromatographed on 2.5 g. of silica gel washed with acid; nonpolar impurities are washed out with 60 ml. of benzene. With 15 ml. of a 9:1 mixture of benzene and ethyl acetate the 3-benzoyloxy-2,2-dimethyl-6-phenyloxyacetylamino-penam is eluted and obtained as a faintly yellowish amorphous product, infrared absorption spectrum (in methylenechloride): characteristic bands at 3.05$\mu$, 5.60$\mu$, 5.80$\mu$, 5.92$\mu$, 6.26$\mu$, 6.62$\mu$, 6.70$\mu$, 8.28$\mu$, 8.50$\mu$, 9.20$\mu$, 9.36$\mu$ and 10.20$\mu$.

EXAMPLE 5

A solution of 0.14 g. of 3 - hydroxy - 2,2 - dimethyl-6-phenylacetylamino-penam in 2 ml. of anhydrous benzene is mixed with 1 ml. of acetic acid anhydride and 0.2 ml. of pyridine; the mixture is heated for 2 hours at 50° C. and then concentrated under reduced pressure. The residue is filtered through a column of 10 g. of silica gel washed with acid. With 30 ml. of a 19:1-mixture of benzene and ethyl acetate and 10 ml. of a 9:1-mixture of benzene and ethyl acetate, the amorphous 3 - acetyloxy - 2,2 - dimethyl-6-(N-phenylacetylamino)-penam is eluted; infrared absorption spectrum (in methylene chloride): characteristic bands at 3.06μ, 5.62μ, 5.76μ, 5.98μ, 6.70μ, 7.35μ, 8.28μ and 9.60μ. The product contains about 10% of the compound epimeric in 2-position.

EXAMPLE 6

A solution of 0.123 g. of 3 - hydroxy - 2,2 - dimethyl-6-phenylacetylamino-penam in 2 ml. of anhydrous benzene is mixed with 0.1 ml. of pyridine and with 0.75 ml. of a 10 ml.-solution of 1 ml. of benzoylchloride in benzene, and the mixture is stirred for 16 hours at room temperature, then diluted with benzene and washed with 0.5 N-hydrochloric acid, a dilute aqueous sodium hydrogencarbonate solution and water; the aqueous washings are extracted with benzene. The organic solutions are combined, dried and concentrated under reduced pressure. The residue is chromatographed on 2.5 g. of silica gel, washed with acid. The 3 - benzoyloxy - 2,2 - dimethyl - 6 - phenylacetylamino-penam is eluted with a 19:1- and a 9:1-mixture of benzene and ethyl acetate in form of a yellow oil; infrared absorption spectrum (in methylene-chloride): characteristic bands at 3.03μ, 5.60μ, 5.80μ, 5.97μ, 6.65μ, 9.18μ, 9.34μ, 9.72μ and 10.15μ.

We claim:

1. A process for the manufacture of compounds of the formula

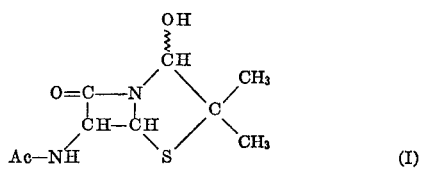

(I)

in which Ac is a member selected from the group consisting of lower alkanoyl, lower alkenoyl, phenylacetyl, 4-hydroxy-phenylacetyl, phenyloxyacetyl, carbo-lower alkoxy, carbo - adamantyloxy, carbo - phenyl - lower alkoxy and carbo - furfuryloxy, wherein a penam compound of the formula

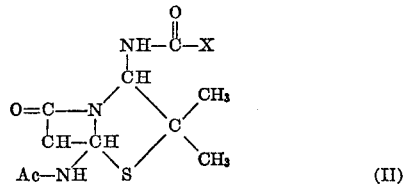

(II)

in which X represents the radical of the formula —O—$R_o{}^b$, wherein R represents a mono- or bi-cyclic carbocyclic arylcarbonylmethyl group, in which aryl is unsubstituted or substituted by lower alkyl, lower alkoxy or halogen, is treated under mild conditions with a chemical reducing agent selected from the group consisting of zinc, a zinc alloy, zinc amalgam or magnesium in the presence of an aqueous acid or an aqueous alcohol, an alkali metal amalgam or aluminum amalgam in the presence of a moist solvent, and a chromium-II-salt in the presence of an aqueous solvent, at least one mol of water being present.

2. A process as claimed in claim 1, wherein $R_o{}^b$ represents the phenacyl radical.

3. A process as claimed in claim 1, wherein a member selected from the group consisting of zinc, zinc-copper and zinc amalgam in the presence of a member selected from the group consisting of an aqueous lower alkane carboxylic acid and an aqueous lower alkanol is used as the reducing agent.

4. A process as claimed in claim 1, wherein zinc and acetic acid, with the addition of water, is used as the reducing agent.

5. A process as claimed in claim 1, wherein a chromium-II compound in the presence of an aqueous medium is used as the reducing agent.

6. A process as claimed in claim 1, wherein the process is carried out in the presence of at least 1 mol of water.

7. A penam compound of the formula

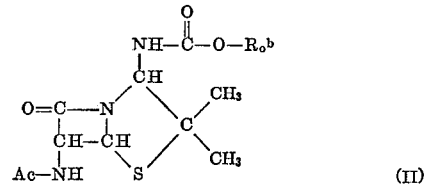

(II)

in which Ac is a member selected from the group consisting of lower alkanoyl, lower alkenoyl, phenylacetyl, 4-hydroxy - phenylacetyl, phenyloxyacetyl, carbo - lower alkoxy, carbo - adamantyloxy, carbo - phenyl - lower alkoxy and carbo - furfuryloxy, and $R_o{}^b$ represents a mono- or bi-cyclic carbocyclic arylcarbonylmethyl group, in which aryl is unsubstituted or substituted by lower alkyl, lower alkoxy or halogen.

8. A penam compound as claimed in claim 9 and being 2,2 - dimethyl - 3 - phenacyloxycarbonyl-amino-6-phenyloxyacetylamino-penam.

9. A penam compound as claimed in claim 9 and being 2,2 - dimethyl - 3 - phenacyloxycarbonyl-amino-6-phenylacetylamino-penam.

10. A penam compound of Formula II as claimed in claim 9, wherein $R_o{}^b$ represents the phenacyl group.

11. A penam compound of Formula II as claimed in claim 9, wherein $R_o{}^b$ is the phenacyl group and Ac represents a member selected from the group consisting of hexanoyl, heptanoyl, 2-hexenoyl, phenylacetyl or phenyloxyacetyl.

References Cited
UNITED STATES PATENTS

| | | | |
|---|---|---|---|
| 3,479,339 | 11/1969 | Holdrege | 260—239.1 |
| 3,652,546 | 3/1972 | Cheney et al. | 260—239.1 |
| 3,652,547 | 3/1972 | Wolf et al. | 260—239.1 |

NICHOLAS S. RIZZO, Primary Examiner

U.S. Cl. X.R.

424—271

PO-1050
(5/69)

UNITED STATES PATENT OFFICE
CERTIFICATE OF CORRECTION

Patent No. 3,808,201  Dated April 30, 1974

Inventor(s) KARL HEUSLER ET AL

It is certified that error appears in the above-identified patent and that said Letters Patent are hereby corrected as shown below:

Column 14, claim 8, line 38, delete "9" and substitute --- 7 ---.

Column 14, claim 9, line 41, delete "9" and substitute --- 7 ---.

Signed and sealed this 5th day of November 1974.

(SEAL)
Attest:

McCOY M. GIBSON JR.
Attesting Officer

C. MARSHALL DANN
Commissioner of Patents